May 6, 1930.                    J. G. SWAIN ET AL                    1,757,752
                                 RIM COLLAPSING TOOL
                                  Filed Nov. 1, 1926              2 Sheets-Sheet 1
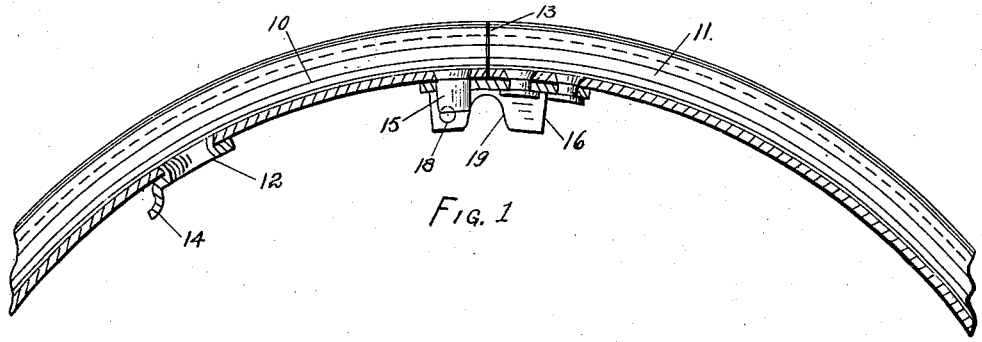
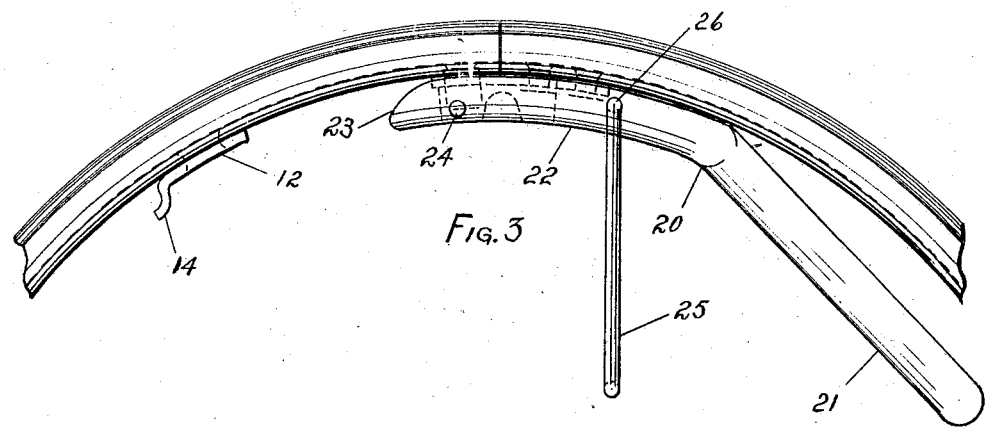
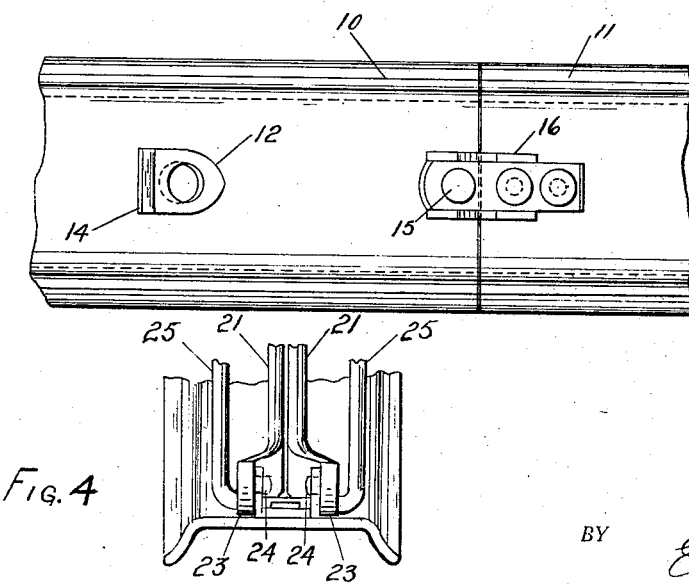
INVENTOR.
JOSEPH. G SWAIN
MARION.W. MITCHELL
BY   Ely Barrow
                ATTORNEYS.

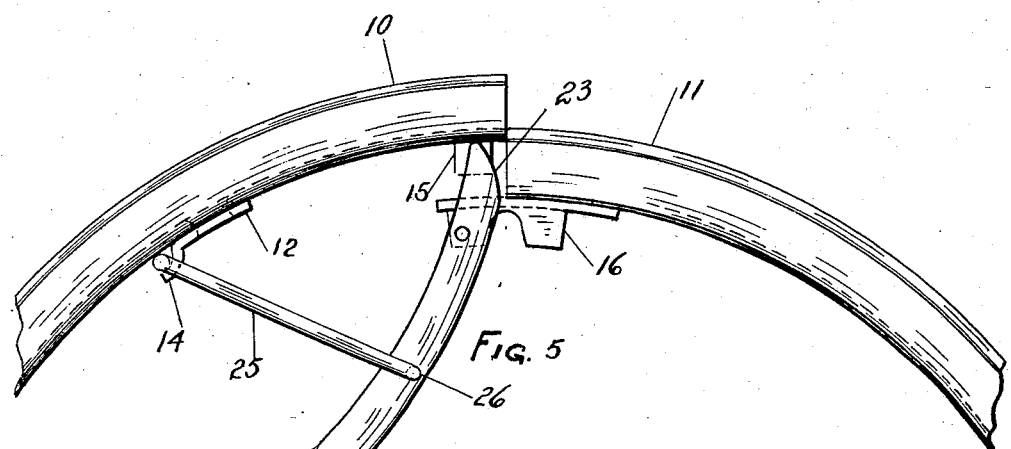
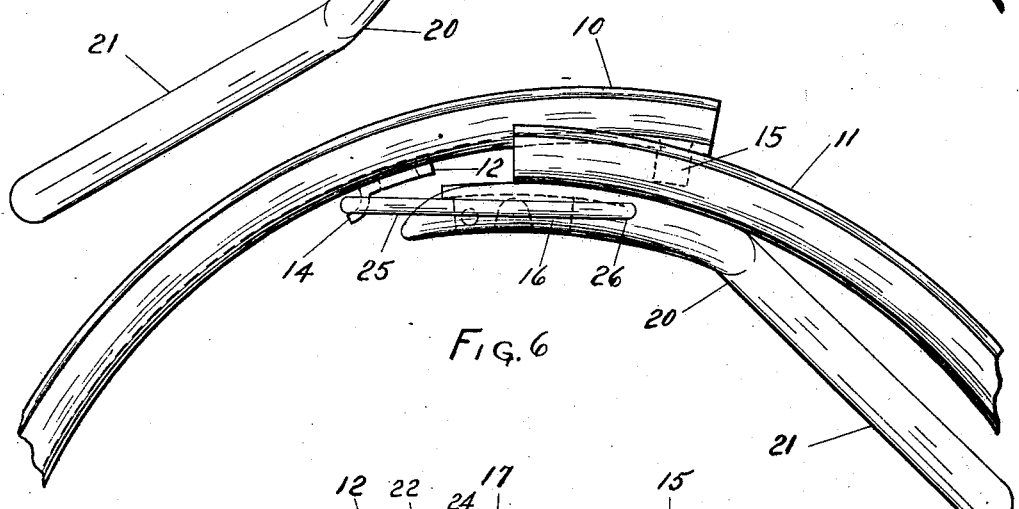
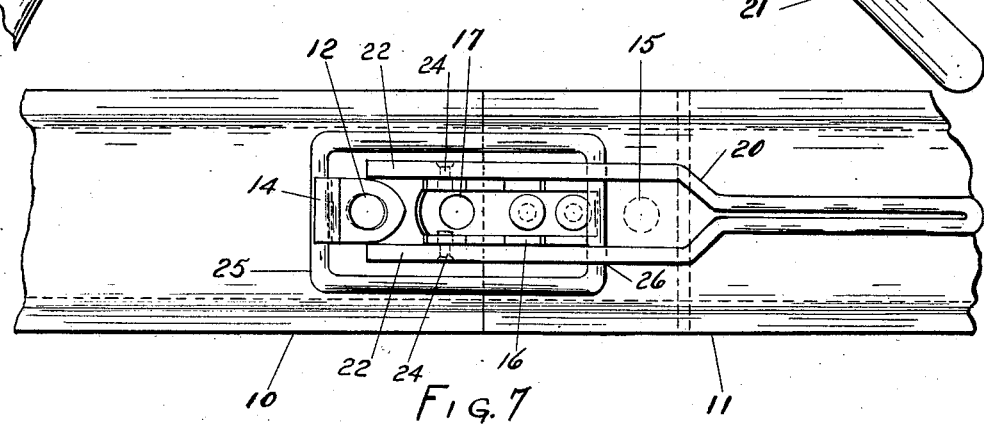

Patented May 6, 1930

1,757,752

UNITED STATES PATENT OFFICE

JOSEPH G. SWAIN AND MARION W. MITCHELL, OF AKRON, OHIO, ASSIGNORS TO THE FIRESTONE STEEL PRODUCTS COMPANY, OF AKRON, OHIO, A CORPORATION OF OHIO

RIM-COLLAPSING TOOL

Application filed November 1, 1926. Serial No. 145,414.

This invention relates to tools for collapsing split rims used for mounting pneumatic tires on wheels.

The general purpose of the invention is to provide apparatus for collapsing tire rims, to reduce their circumference when mounting or removing a tire therefrom, and for accomplishing this operation in an easy and effective manner with a minimum number of steps and without unduly distorting the rims. Tools have been provided heretofore, to perform these functions, but these have not been entirely satisfactory in use.

One object, therefore, is to provide a tool for drawing one end of the split rim radially inward and then circumferentially past the other to reduce the circumference of the rim without swinging said end through the arc of a circle. Another object is to provide a rim contracting tool so designed as to resist movement thereof by the expanding force of the rim.

The foregoing and other objects are obtained by the apparatus illustrated in the accompanying drawings and described below. It is to be understood that the invention is not limited to the particular form thereof shown and described.

Of the acompanying drawings:

Figure 1 is a sectional elevation of a tire rim illustrating means for cooperating with the tool embodying the invention;

Figure 2 is a plan thereof as viewed from the interior of the rim;

Figure 3 is an elevation illustrating the tool as first positioned on the rim;

Figure 4 is an end elevation of the tool and one end of the rim as positioned in Figure 3;

Figure 5 is an elevation illustrating the parts at the end of the first operation;

Figure 6 is an elevation illustrating the parts at the end of the second operation; and Figure 7 is a plan thereof as viewed from the interior of the rim.

Referring more particularly to the drawings, 10 and 11 indicate the two ends of a split, annular, contractile tire rim such as used for mounting tires on automobile wheels. A reinforcing eye 12 is swaged through a hole in the rim end 10 at a point removed from the split 13 to provide a reinforced aperture through which to pass the valve stem (not shown) of an inner tube. An extension of eye 12 forms a broad hook 14, the function of which will appear later. Also riveted on rim end 10 adjacent split 13 is a lug 15 having a cylindrical head directed radially inward of the rim. A channel-shaped member or latch 16 is riveted to rim end 11, a portion of said member overlapping split 13 and being provided with an aperture 17 through which lug 15 may pass to maintain the rim ends in alignment and prevent their spreading when the rim is in use. The sides of channel member 16 are provided near one end with apertures 18, 18 and through their mid-portions with notches 19, 19. The latter serve as a driving means for the rim to prevent its rotation relative to the wheel (not shown) when a bolt (not shown) is passed through the felly of the wheel and through said notches.

The tool 20 comprises a handle portion 21 and a bifurcated yoke portion consisting of arms 22, 22 having their ends rounded to provide cam faces 23, 23. Arms 22, 22 are provided near their rounded ends with lugs 24, 24 adapted to enter apertures 18, 18 when arms 22, 22 are snapped about channel member 16 as shown in Figure 3. A bail 25 is swingably mounted through holes bored at 26 near the other ends of arms 22, 22 and is of such a length that its outer end may be engageable over hook 14 when tool 20 is in the positions illustrated in Figures 5 and 6.

In operation, tool 20 is positioned as in Figure 3 and handle 21 swung downwardly to draw rim end 11 radially inward of rim end 10 and disengage lug 15 from aperture 17, rim end 11 just clearing rim end 10 as shown in Figure 5. Thus the tool acts as a lever of the first class, being pivoted about lugs 24, 24 while cam faces 23, 23 ride against rim end 10. The end of bail 25 is engaged under hook 14 as illustrated in Figure 5 and handle 21 swung back to its original position, forcing rim end 11 circumferentially past rim end 10 to decrease the circumference of the rim (Figures 6 and 7). During this latter operation, the tool acts as a lever of the second class, being pivoted about point 26. Since tool 20 swings past its dead center line, it will remain of its own accord in position against the rim.

To return the rim ends to their normal position, handle 21 is swung downwardly, bail 25 released from hook 14 and the handle slowly returned to position flat against the rim, the rim ends again assuming the position shown in Figure 3. During the latter motion of the tool, cam-faces 23, 23 slide against the inner face of the rim end 10 and have a braking action, whereby the rim tool is prevented from violently snapping back against the rim. Tool 20 is then removed from the rim by spreading arms 22, 22 and disengaging lugs 24, 24.

A simple tool and cooperating means on the rim are thus provided for effectively collapsing tire rims.

Modifications of the above described invention may be resorted to without departing from the spirit thereof or the scope of the appended claims.

What is claimed is:

1. A bifurcated tool for collapsing and expanding transversely split rims, said tool comprising a handle portion, spaced arm portions each having a cam face on its end, a pivot lug provided on each of the arm portions adjacent said end and adapted to be positioned in apertures in one end of a tire rim, whereby said tool may be operable as a lever of the first class to draw said rim end radially inwardly of the other as said handle portion is swung inwardly and said cam faces are urged against said other rim end, and a bail pivoted on said arm portions at a point remote from said cam faces, the free end of said bail being engageable with said other rim end, whereby the tool may be operable as a lever of the second class to draw the other rim end circumferentially past the first-named rim end to reduce the circumference of said rim.

2. A tool for collapsing and expanding transversely split rims, said tool comprising an arm portion, a pivot lug provided on the arm portion adjacent an end thereof, said arm portion being formed with a cam face on the end thereof extending beyond said pivot lug, said pivot lug being adapted to be positioned in an aperture formed in one rim end and said cam face being engageable with the other rim end whereby said tool may be operable as a lever to draw the face of said rim ends radially inwardly of the other of said rim ends, and means for drawing the last-named rim end circumferentially past the first-named rim end to reduce the circumference of said rim.

3. A tool for collapsing transversely split rims, said tool being adapted to pivot on one rim end, a rim splitting cam on the end of said tool on one side of the pivot, and a rim contracting bail pivoted on the tool on the other side of the pivot and engageable with the other rim end.

4. A tool for collapsing split rims, comprising a handle portion, a bifurcated yoke portion, and a bail pivoted to said yoke portion, the latter portion including arms having cam faces on their ends and pivot lugs adjacent said ends between the bail and the cams.

5. A bifurcated lever for collapsing split rims, said lever comprising spaced arms having pivot lugs thereon, cam faces on the ends of said arms on one side of the pivot lugs, and a bail pivoted on said arms on the other side of the pivot lugs.

6. A lever for collapsing split rims, said lever having a cam face on one end thereof, and a bail pivoted to said lever, said lever having a means for fixedly pivoting it to one rim end between the cam face and the bail.

7. Apparatus of the class described, comprising, a split rim operating tool including a lever and means on the lever for drawing one end of said rim first radially inwardly to split the rim as the lever is thrown in one direction, and means for drawing said end of the rim circumferentially past the other end of the rim to reduce the circumference thereof as the lever is thrown in the opposite direction.

JOSEPH G. SWAIN.
MARION W. MITCHELL.